(12) United States Patent
Gershteyn

(10) Patent No.: US 9,616,958 B2
(45) Date of Patent: Apr. 11, 2017

(54) MOTORCYCLE FOOT ANCHOR

(71) Applicant: Igor Gershteyn, Wantagh, NY (US)

(72) Inventor: Igor Gershteyn, Wantagh, NY (US)

(*) Notice: Subject to any disclaimer, the term of this patent is extended or adjusted under 35 U.S.C. 154(b) by 0 days.

(21) Appl. No.: 15/019,886

(22) Filed: Feb. 9, 2016

(65) Prior Publication Data

US 2016/0159423 A1    Jun. 9, 2016

Related U.S. Application Data

(63) Continuation of application No. 14/548,355, filed on Nov. 20, 2014, now Pat. No. 9,290,225.

(60) Provisional application No. 61/906,715, filed on Nov. 20, 2013, provisional application No. 61/980,805, filed on Apr. 17, 2014.

(51) Int. Cl.
*B62J 25/00* (2006.01)

(52) U.S. Cl.
CPC .................................... *B62J 25/00* (2013.01)

(58) Field of Classification Search
CPC ............................ B62J 25/00; Y10T 74/20918
See application file for complete search history.

(56) References Cited

U.S. PATENT DOCUMENTS

| | | | |
|---|---|---|---|
| 5,354,086 A | 10/1994 | Mueller | |
| 5,524,726 A | 6/1996 | Wright, Jr. | |
| 5,893,424 A | 4/1999 | Hisada | |
| 6,173,983 B1 | 1/2001 | Moore | |
| 6,663,129 B1 | 12/2003 | Smith | |
| 6,719,316 B1 | 4/2004 | Anthony | |
| 6,957,821 B2 | 10/2005 | Gorman et al. | |
| 7,108,273 B2 * | 9/2006 | Hunwardsen | B62J 25/00 180/219 |
| 7,234,558 B2 | 6/2007 | Toftner | |
| 7,264,255 B1 * | 9/2007 | Winfrey | B62J 25/00 180/219 |
| 7,641,212 B1 | 1/2010 | Liao et al. | |
| 8,733,205 B2 | 5/2014 | Fromby et al. | |
| 2004/0222613 A1 | 11/2004 | Cramer | |
| 2007/0278765 A1 | 12/2007 | Dugan | |
| 2008/0296878 A1 | 12/2008 | Pruit | |
| 2009/0320639 A1 | 12/2009 | Segato et al. | |
| 2015/0137479 A1 | 5/2015 | Gershteyn | |

\* cited by examiner

*Primary Examiner* — Kevin Hurley
(74) *Attorney, Agent, or Firm* — Sean R. Wilsusen

(57) ABSTRACT

A motorcycle foot anchor includes a foot anchor including a base, a body and an end portion. The base of the foot anchor is coupled to a motorcycle frame. The foot anchor protrudes from the motorcycle frame. A plurality of concentric grooves including pointed edges are disposed on the foot anchor. The pointed edges of the concentric grooves point toward the motorcycle frame. The end portion of the foot anchor has a larger diameter than a diameter of the body of the foot anchor.

20 Claims, 6 Drawing Sheets

MOTORCYCLE FOOT ANCHOR

CROSS-REFERENCE TO RELATED APPLICATION

This application is a continuation of U.S. patent application Ser. No. 14/548,355, filed Nov. 20, 2014, which claims priority from U.S. Provisional Patent Application 61/906,715, filed Nov. 20, 2013, and from U.S. Provisional Patent Application 61/980,805, filed Apr. 17, 2014, the entire contents of which are incorporated by reference herein.

TECHNICAL FIELD

The present invention relates to a foot anchor for a motorcycle. More particularly, the present invention relates to foot anchor for sport oriented motorcycles (e.g., "sportbikes") optimized for speed, acceleration, braking, and cornering in left and right turns at high speeds.

DISCUSSION OF RELATED ART

A motorcycle proceeding through a turn may lean to an inside of the turn. Leaning to the inside of the turn may counteract a centrifugal force generated as the motorcycle proceeds through the turn. A lean angle may be measured from the motorcycle's upright position. A motorcycle in an upright position has a lean angle of zero degrees. As the motorcycle leans further away from an upright position, the lean angle increases. A lateral component of the centrifugal force applied to a center of mass of motorcycle-rider mechanical system may pull a mechanical system of the motorcycle and the motorcycle rider to the outside of a turn. The lateral component of the centrifugal force may be precisely counteracted by the force of gravity combined with the motorcycle rider leaning into an inside of the turn, thus leaving a turning motorcycle in balance between these two forces. A motorcycle with rider neither falls down to the inside of the turn, nor falls to the outside of the turn. In order to ride faster with the same rider, through the same turn, with the same turning radius, a motorcycle rider needs to lean further into the inside of a turn in order to compensate for the increased centrifugal force directed to the outside of the turn. The maximum speed through such turn may be limited by the maximum possible lean angle of the motorcycle and/or motorcycle rider.

A motorcycle's center of mass is measured along a same vertical plane as a plane of two wheels of the motorcycle. When a rider is seated in an upright position on a motorcycle, the rider's center of mass is aligned with the same vertical plane as the two motorcycle wheels. The center of mass of motorcycle's mechanical system may also be measured along the same vertical plane.

Sportbike riders may employ a technique of leaning into a turn referred to as a hanging off technique by shifting the rider's body to the inside of a turn. The combined center of mass of the motorcycle rider and the motorcycle's mechanical system may be shifted to the inside of a turn. While the lean angle of the motorcycle's mechanical system is the same, the effective lean angle of the rider's center of mass may be increased by leaning further into the turn while at the same time the actual lean angle of the motorcycle may be decreased or kept constant.

The hanging off technique may allow a motorcycle rider to reduce the lean angle of a sportbike while going through the same turn, with the same turning radius and the same speed. The hanging off technique may allow the same rider to ride faster through the same turn, while the same turning radius and the same lean angle of a sportbike are maintained.

The less the lean angle of a sportbike in a turn, the higher a rate of acceleration or deceleration may be without the tires of the sportbike losing traction. The hanging off technique may reduce the required lean angle of a sportbike and a rider may be able to accelerate or decelerate at a higher rate when going through the same turn, with the same turning radius and at the same speed.

The more the rider's body is shifted away from the sportbike and to the inside of a turn, the faster the sportbike with the same rider may go through the same turn, with the same turning radius, and with the same sportbike lean angle.

The more the rider's body is shifted away from the sportbike and to the inside of the turn, the higher the rate of acceleration or deceleration a sportbike can sustain without the tires losing traction with the same rider going through the same turn, with the same turning radius, and with the same speed.

When a rider utilizes the hanging off technique, a rider may hold onto the sportbike by gripping the body of a sportbike with the rider's outside leg. The portion of the sportbike rider's leg above the rider's knee may rest on the sportbike seat with the inner knee area of the sportbike rider pressed against the sportbike. The inner knee area of the sportbike rider's leg may be pressed against an outside of the gas tank of the sportbike. The sportbike rider's leg may be bent at the knee at approximately a right angle or slightly less than right angle. The lower portion of the sportbike rider's leg below the knee may be pressed against the outside side of the sportbike. Effectively, the rider's outside leg may form a hook around the sportbike seat and the outer side of the sportbike which prevents the rider from falling off the sportbike while executing the hanging off technique. In order to perform the hanging off technique in such a way, the hamstring muscles may have to stay continuously contracted while the rider is hanging off throughout a turn.

A sportbike rider may be limited in how far the upper body can be shifted away from a sportbike and to the inside of a turn in order to reduce the lean angle of a sportbike by the ability of the rider to maintain contact between his/her leg and the sportbike. Moving the upper body of the sportbike rider too far away from a sportbike may cause the sportbike rider to slip and cause the sportbike rider to fall off a sportbike.

For example, a bump, imperfection or obstruction in the road or a momentary instability of a sportbike such as a tire slip or a shake may cause the sportbike rider to slip and cause the sportbike rider to fall off a sportbike.

BRIEF DESCRIPTION OF THE DRAWINGS

The above and other features of the inventive concept will become more apparent by describing in detail exemplary embodiments thereof, with reference to the accompanying drawings in which.

DETAILED DESCRIPTION

Figure 1:
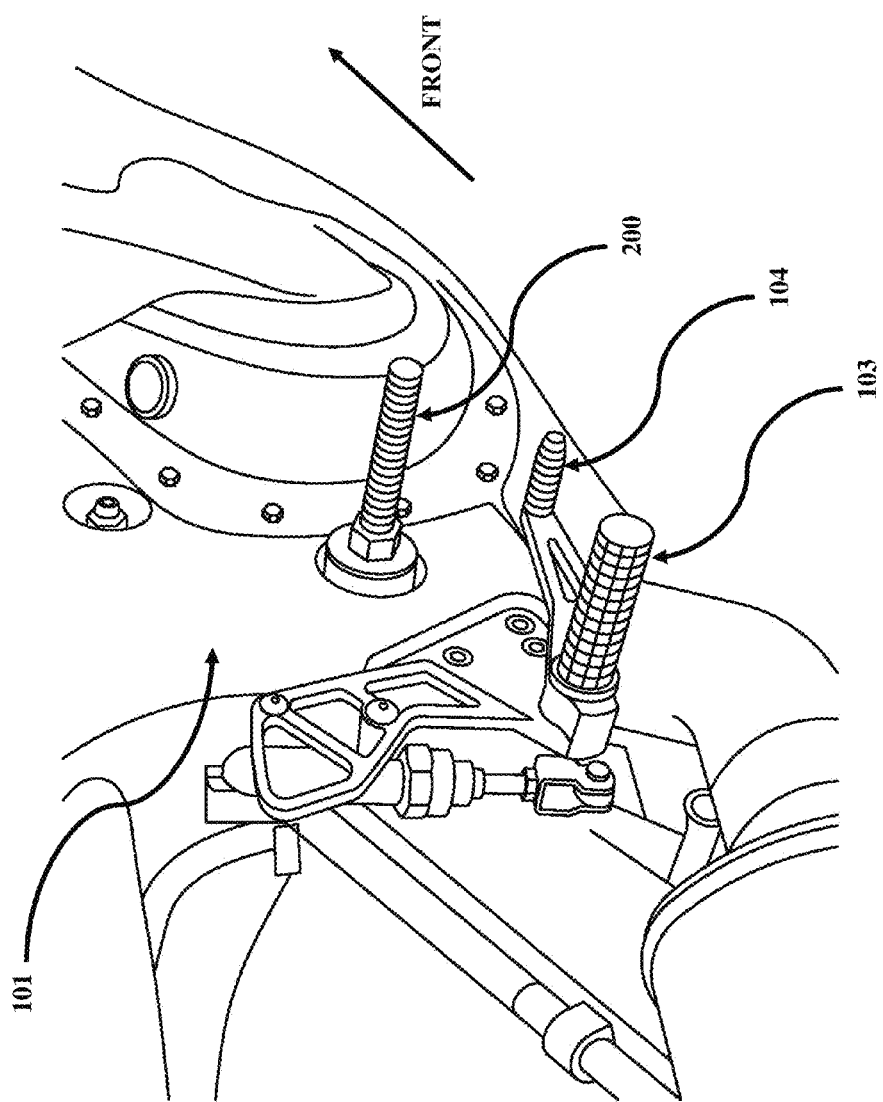
FIG. 1 is a side view of a sportbike including a right foot anchor, and a rear brake lever according to an exemplary embodiment of the present inventive concept.

Exemplary embodiments of the present inventive concept will now be described more fully with reference to the accompanying drawings in which some exemplary embodiments are shown. The present inventive concept may, however, be embodied in different forms and should not be construed as limited to the exemplary embodiments set forth herein. Rather, these embodiments are provided so that this disclosure is thorough and complete and fully conveys the inventive concept to those skilled in the art.

It will be understood that body positions of sportbike riders illustrated in the figures and the precise angles of a sportbike rider's arms and legs may be exaggerated or understated for clarity of explanation, or to demonstrate average positions so as to fully convey the inventive concept to those skilled in the art.

When riding a sportbike in a normal (e.g. vertical) position, the rider's feet may rest on right and left footpegs of the sportbike. It should be noted that footpegs are commonly disposed on sportbikes to support a bottom of a sportbike rider's foot. The gear shift lever may be located on the left side of a sportbike, a few inches forward from the left footpeg and slightly lower than the left footpeg. The rear brake lever may be located on the right side of a sportbike, a few inches forward from the right footpeg and slightly lower than the right footpeg. The foot anchors 200 described herein may be positioned on a sportbike to be separately disposed from the footpegs, gear shift lever and break levers. The terms "sportbike" and "motorcycle" may be used interchangeably throughout the specification and drawings.

When the rider is executing a hanging off technique (e.g. when transitioned into a leaned position), the rider may not be able to use his hands to hold on to a sportbike in order to support the rider's upper and lower body. The upper body's stable position may be supported mainly by the legs and lower body. The rider's hands may have limited grip of the sportbike's handlebars. The rider's hands and arms may provide inputs to a sportbike such as steering, throttle control, front brake control, and clutch control. An attempt by the sportbike rider to primarily use the rider's hands and arms to control the position of the rider's upper and/or lower body may result in uncontrolled or undesirable steering and result in the rider losing control of the sportbike and falling off.

The rate at which the sportbike transitions from a vertical position to a desired leaned position is generally referred to as a turn-in rate. The turn-in rate may depend on how aggressively a rider leans a sportbike and the speed of a sportbike. Leaning a motorcycle is achieved through counter steering effort applied to the handlebars. The stronger the counter steering effort, the quicker the turn-in rate. However, the higher the speed of a sportbike, the slower the allowed turn-in rate may be. During a turn-in, a sportbike effectively rotates around a roll axis which is a straight line going through a sportbike's center of mass in the direction of a sportbike travel. In order to quicken a turn-in rate, the rider may shift the rider's body weight onto the inside footpeg during the counter steering action, thus creating an additional turning momentum increasing the turn-in rate. While being helpful, such additional turning momentum is somewhat limited because it is applied at the footpeg which is located relatively close to the roll axis. If the pavement conditions are not ideal, such as, for example, being wet, containing sand, containing other debris, having uneven surface, or cambered, a rider is limited in how much counter steering effort can be applied, risking the loss of traction at the front and/or rear tires. In ideal road conditions, the rider is limited by how much counter steering the rider is capable of exerting, thus providing less counter steering effort than would be desirable in order to achieve a higher turn-in rate.

A turn-in rate is an important factor in some types of turns such as, for example, turns of 90 degrees or more, small radius turns, or a series of turns following each other in quick succession known as S-turns. The quicker the turn-in rate, the faster the sportbike can enter such a turn and be able to go through it successfully. A slower turn-in rate forces a rider to use slower speed through such turns.

Referring to FIG. 1, a right foot anchor 200 is attached to a sportbike as explained in more detail below. A left foot anchor 200 (see e.g., FIG. 4) may be anchored to a left side of the sportbike in a mirror image position with regard to the right side of the sport bike. While a right foot anchor 200 is illustrated in FIG. 1, unless otherwise specified, the left side foot anchor 200 is the same as the right foot anchor 200, except that the position of the left foot anchor 200 is a mirror image of the right foot anchor 200 position.

A foot anchor 200 may be attached to the right and/or left sides of a motorcycle fame 101 (i.e. sportbike), either directly or indirectly via one or more connecting members 510. The foot anchor 200 may be anchored to the sportbike at any desired position in order to prevent the sportbike rider's foot from lifting up from a lower portion of the sportbike frame. For example, the foot anchor 200 may be located in the area 1-9 inches higher than a gear shift lever 102. However the position of the right and left foot anchors 200 are not limited to this particular position.

The foot anchor 200 may be formed of any strong and rigid material that is suitably strong for maintaining the position of the rider's foot in order to facilitate the hanging off technique, while supporting the rider's body weight. For example, the foot anchor 200 may include steel, aircraft grade aluminum, or any other suitable material. The foot anchor 200 may have a length comparable to the length of a sportbike footpeg 103. The length of the foot anchor 200 may be adjustable, even when attached to the sportbike, for example, through length adjustment members on the connection members. The length of the right and left foot anchors 200 may be slightly longer or slightly shorter than a sportbike footpeg 103 (e.g. the right footpeg illustrated in FIG. 1). The foot anchor 200 may extend substantially laterally and may be parallel to the footpeg 103 on the same side of a sportbike. The foot anchor 200 may extend slightly downward toward the bottom of the sportbike. The foot anchor 200 may have a variable downward bend which is greater at the end of the foot anchor 200 which is furthest away from the sportbike's frame. The foot anchor 200 may have a cylindrical shape. The diameter of the end of the foot anchor 200 furthest away from the frame of the sportbike may be slightly larger than an end of the foot anchor 200 that is closest to the sportbike's frame. The shape of the foot anchor 200 may approximately resemble the shape of a mushroom. The foot anchor 200 may include groves (e.g., concentric grooves 401) cut into a surface of the foot anchor 200 (e.g., in a base 201, body 202 and end portion 203 of the foot anchor). A direction of the grooves may be parallel to the path of travel of the sportbike (see FIG. 1 or 4, for example) when the front of the sportbike is traveling in a straight line (i.e. is not turning). The foot anchor 200 with grooves running parallel to the path of travel of the sportbike may be configured to allow the rider's foot to more easily slide off of the foot anchors 200 in the front and back direction (the direction of the path of travel) while preventing the rider's foot from sliding off of the foot anchor 200 laterally (e.g., away from the center of the sportbike). A surface 404 of the end 203 of the foot anchor 200 furthest away from the frame of the sportbike and facing perpendicular to the straight path of travel of the sportbike may have a rounded shape. The end of the foot anchor 200 furthest away from the frame of the sportbike and facing perpendicular to the straight path of travel of the sportbike may have flat shape. Referring to FIG. 1, the foot anchor 200 may be located approximately 1-9 inches above the gear shift lever 102 or the rear break lever 104. The foot anchor 200 may be permanently attached directly to the motorcycle frame 101. The foot anchor 200 may be removably attached to the sportbike frame 101.

Foot anchors 200 may be attached to the right and left side of the sportbike either directly or indirectly via connecting members 510. The foot anchors 200 and/or the connecting members 510 may be positioned in the area a few inches higher than the rear brake lever 104, however not necessarily exactly above the rear brake lever 104. The connecting members 510 may be adjustably fixed to the sportbike, and adjusting members and/or the foot anchors 200 connected to the connecting members 510 may be adjustable to move to different positions on the frame of the sportbike. For example, the connecting members 510 may allow the foot anchors 200 to be moved to different pre-determined positions to accommodate different riding styles or positions for a single rider, or to accommodate riders of different sizes.

The right and left foot anchors 200 may have precisely the same dimensions and physical characteristics as each other. The right and left foot anchors 200 may have different dimensions and physical characteristics. For example, a right foot anchor 200 may be longer than a left foot anchor 200. For example, a right foot anchor 200 may have a different shape from the left foot anchor 200 and/or the right foot anchor 200 may include a different material from the left foot anchor 200. The right and left foot anchors 200 may be disposed at slightly different positions from each other. For example, a rider may have different strength capabilities between his/her right and left legs which may make it desirable to position the foot anchors 200 to be in different positions on the right and left sides of the sportbike, respectively.

One or more of the foot anchors 200 may retract into the frame of the sportbike. For example, the foot anchors 200 may retract into the frame of the sportbike so as to not protrude at all from the frame of the sportbike. The foot anchors 200, when retracted, may become completely concealed inside the frame of the sportbike. For example, the ends of the foot anchors 200 that are furthest away from the sportbike during use may be substantially flush with the frame of the sportbike or with the connecting members 510 supporting the foot anchors 200 when the foot anchors 200 are retracted. The foot anchors 200 may be retracted manually, or may retract in response to an electrical signal or the like generated from a remote control or the like.

One or more of the foot anchors 200 may fold against the frame of the sportbike. For example, the foot anchors 200 may fold according to a mechanism associated with the connecting members 510, or according to a mechanism associated directly with the sportbike frame. For example, the end of the foot anchors 200 that is furthest away from the sportbike during use may be substantially flush with the frame of the sportbike or with the connecting members 510 supporting the foot anchors 200 when the foot anchors 200 are folded. The foot anchors 200 may be folded manually, or may fold in response to an electrical signal or the like generated from a remote control or the like.

One or more of the foot anchors 200 may be detachably connected to the sportbike, either directly to the frame, or by being coupled to the connecting members 510. The foot anchors 200 may be detached from the sportbike to be removed for storage, safety, or the like, for example. For example, the connecting members 510 may allow the foot anchors 200 to be removed from the sportbike frame.

Referring to FIG. 1, the right foot anchor 200 may be located approximately 1-9 inches above the rear brake lever 104, and may be attached directly to the motorcycle frame 101. For example, the foot anchors 200 may be formed of a single, continuous rod 610 that is inserted through the frame of the sportbike.

The foot anchors 200 may stably anchor the rider's feet to the sportbike when a rider executes the hanging off technique. The use of the foot anchors 200 may allow the rider to adjust the position of the sportbike and/or the position of the rider's upper and/or lower body to proceed through a turn more quickly without losing control of the sportbike through loss of contact between the rider's inside leg and the sportbike.

The connecting members 510 may allow the foot anchors 200 to be attached at different locations, thus allowing the exact placement of foot anchors 200 to be adjusted. The adjustment of the placement of the foot anchors 200, for example, by using the connecting members 510, may satisfy the convenience and personal preference of different riders.

For example, if a rider intends to ride through a left turn and is about to shift the rider's body to the left in order to execute the hanging off technique, such rider may slightly move his/her right foot forward and positions the toe area of the right foot, which is the upper portion of the foot, under the right foot anchor 200, and then shift his/her body to the left and off the sportbike. A rider may be able to move his upper body to the left of the sportbike and farther away from a sportbike because his/her right foot is solidly anchored under the right foot anchor 200. The right foot along with the lower right leg may be substantially unable to move upward due to being anchored by the right foot anchor 200, thus preventing a rider from losing contact with, and control of the sportbike and falling off a sportbike.

The right and left foot anchors 200 may prevent a rider from falling off a sportbike when riding in a straight line when the sportbike contacts an imperfection, such as a bump or pothole, in the road surface.

Figure 2:
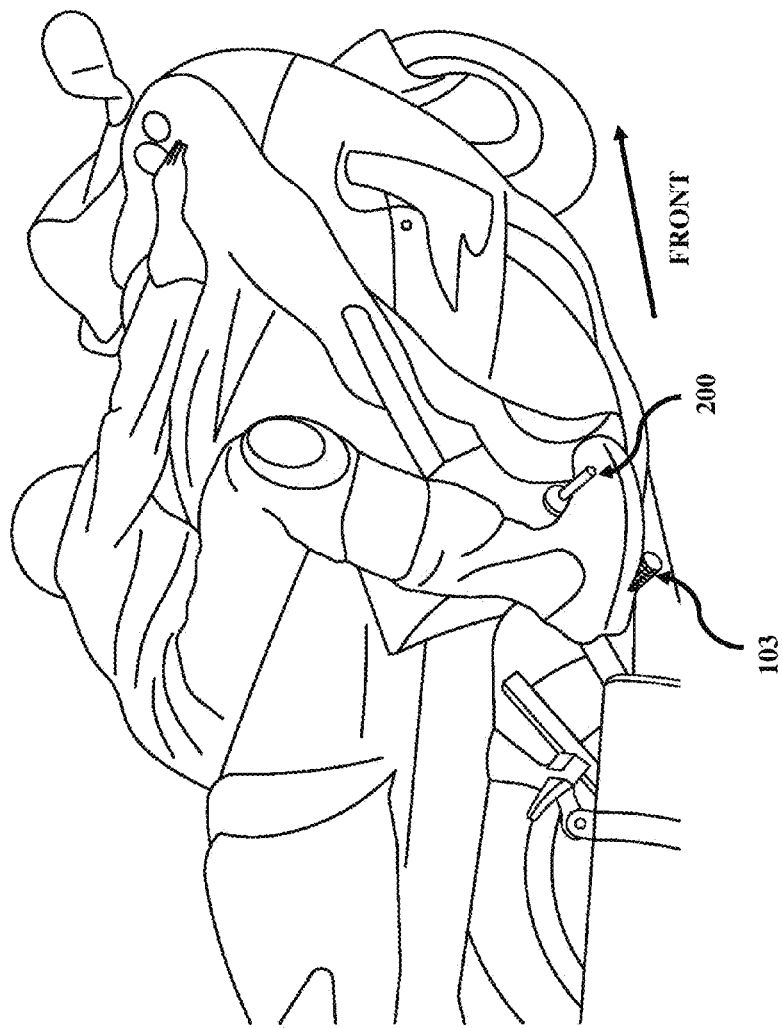
FIG. 2 is a right side view of a sportbike with a rider having an upper body position when a rider is executing the hanging off technique to the left of the sportbike with the rider's right foot pressed against the right foot anchor according to an exemplary embodiment of the present inventive concept.

Referring to FIG. 2, the sportbike rider may utilize the right foot anchor 200 as an anchor which prevents the rider's right foot or right leg from moving upward. The bottom of the right foot may be positioned atop of the rear brake lever 104, but need not exert any downward pressure on the rear brake lever 104 because of sufficient clearance between the rear brake lever 104 and the right foot anchor 200. The same arrangement may be applied to the left side of the sportbike;

As explained above, utilizing foot anchors 200 may prevent a rider from falling off a sportbike when shifting the rider's upper body to the inside of a turn. A rider may be capable of shifting the rider's torso aggressively and forcefully to the inside of a turn while performing a counter steering without the fear of falling off a sportbike. Because a rider's torso is located far away from a sportbike's roll axis and because the weight of a human torso is significant, such action may create an additional powerful turning momentum which increases a sportbike's turn-in rate regardless of other factors such as rider's physical strength to apply counter steering, or road conditions.

For example, if a rider intends to ride through a right turn and is about to shift his body to the right in order to execute the hanging off technique, such rider may slightly move his/her left foot forward and positions the toe area of the left foot, which is the upper portion of the foot, under the left foot anchor 200, and then shift his/her body to the right and off the sportbike. A rider may be able to move his/her upper body to the right of the sportbike and farther away from a sportbike because his/her left foot is solidly anchored under the left foot anchor 200. The left foot along with the lower left leg may be substantially unable to move upward, thus preventing a rider from falling off a sportbike.

Referring to FIG. 2, the rider's upper body may be anchored to a sportbike when utilizing the right foot anchor 200. FIG. 2 illustrates what movements of the rider's respective body parts may occur in order for the rider's body to be separated from a sportbike. The rider's right foot may need to move backward, the rider's lower leg may need to move upward, and the rider's upper leg may need to move to the left of the sportbike;

FIG. 2 illustrates, for example, that without utilizing the right foot anchor 200, the rider's upper body may be anchored to a sportbike less reliably. FIG. 2 illustrates what movements of the rider's respective body parts need to occur in order for the rider's body to be separated from a sportbike. The rider's lower leg may need to move upward, and the rider's upper leg may need to move to the left of the sportbike.

The body positions illustrated in FIG. 2 also apply to the left side of a sportbike.

While executing the hanging off technique, FIG. 2 illustrates that holding on to a sportbike utilizing a foot anchor 200 is more sturdy, stable, and reliable than holding on to a sportbike without the use of a foot anchor 200. As a result, the rider is able to move the rider's upper body further away from a sportbike with a reduced risk of falling off a sportbike The presence of the groves on foot anchors 200, or various shapes and bends of such foot anchors 200 as described above may prevent the foot from sliding accidentally in the lateral direction, while at the same time allowing for the ease of the foot movement in forward and backward directions. When the foot anchors 200 include the slightly rounded shape of the foot anchor's 200 end, it may prevent the foot anchor 200 from catching the rider's clothing or riding boots when the sportbike is stationary, in motion, or when the rider's feet are on the ground and the rider's legs may be touching the aforementioned foot anchors 200 (e.g., when in a stopped position on a roadway).

Figure 3:
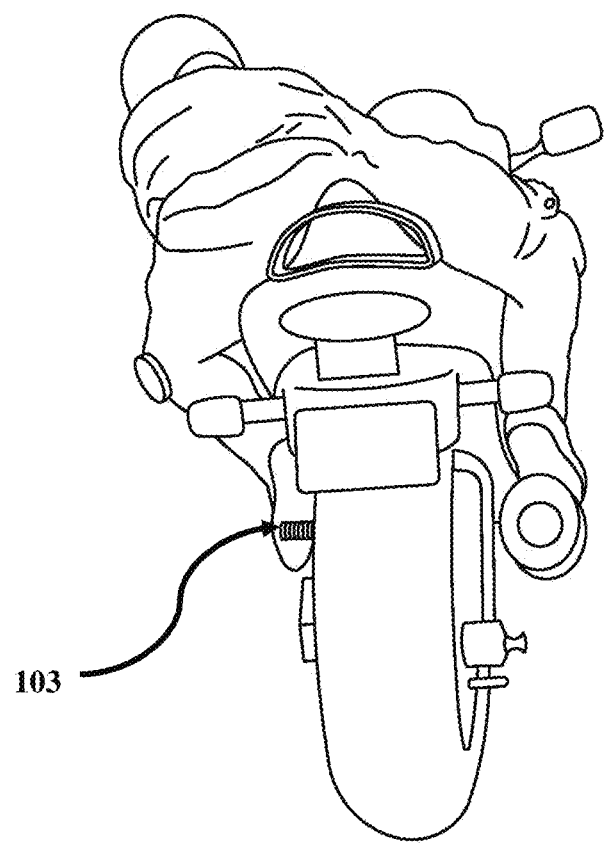
FIG. 3 is a rear view of a sportbike with a sportbike rider's foot being anchored to the right foot anchor according to an exemplary embodiment of the present inventive concept.

Referring to FIG. 3, for example, when in a turn, by placing the rider's outside foot directly under the foot anchor 200, the rider may be able to move the rider's upper body farther away from the sportbike by a few inches or more to the inside of the turn and away from a sportbike than without such foot anchor 200. As a result, a sportbike may be able to travel 1%-30% faster with the same rider, through the same turn, with the same turn radius, and the same sportbike lean angle. The greater the rider weight to sportbike weight ratio, the more significant the expected increase in speed may be. A sportbike may be able to travel with a lesser lean angle with the same rider, through the same turn, with the same turn radius, and the same speed. A sportbike may allow for greater acceleration or deceleration rate respectfully and without losing traction with the same rider, through the same turn, with the same turn radius, and with the same speed.

Figure 4:
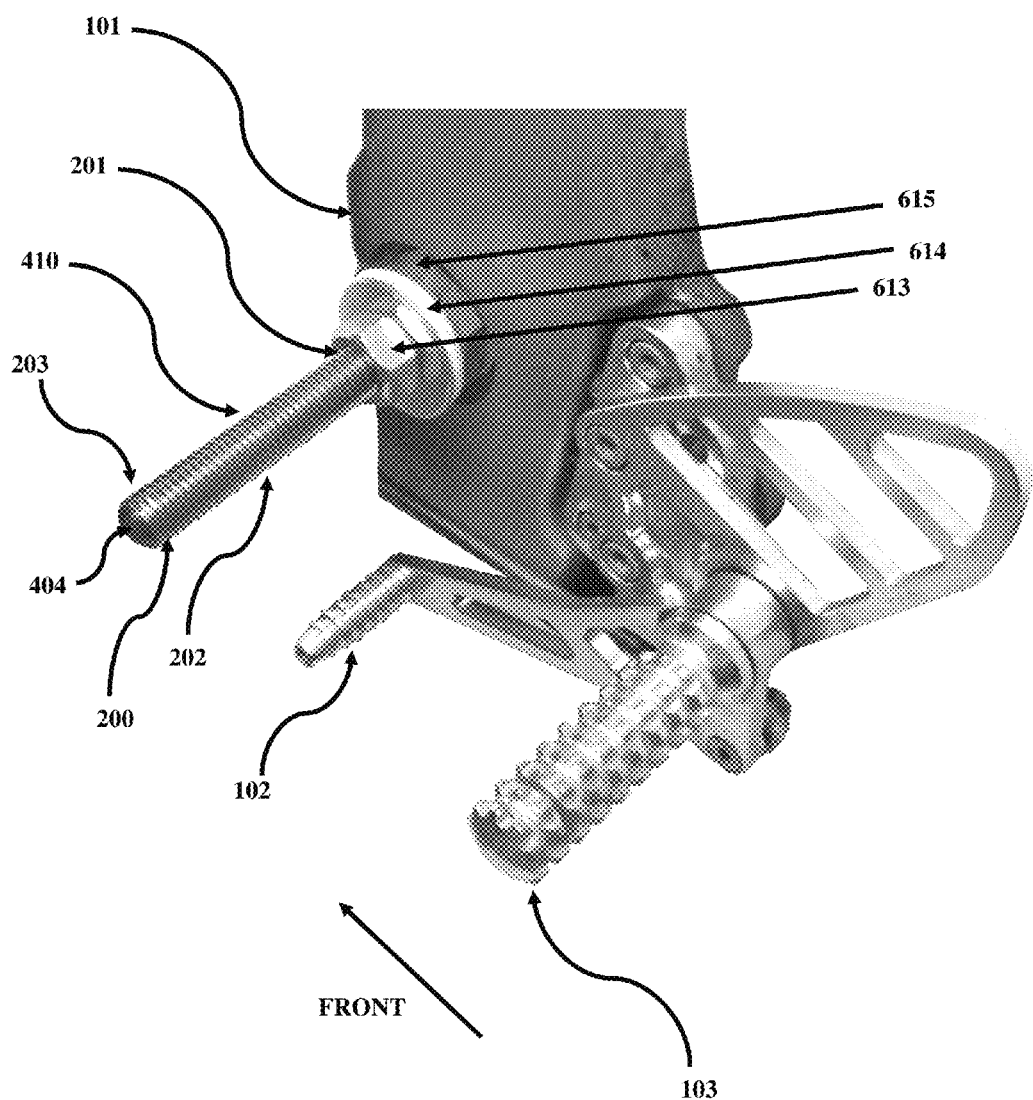
FIG. 4 is a side view of a foot anchor according to an exemplary embodiment of the present inventive concept.
Figure 6:
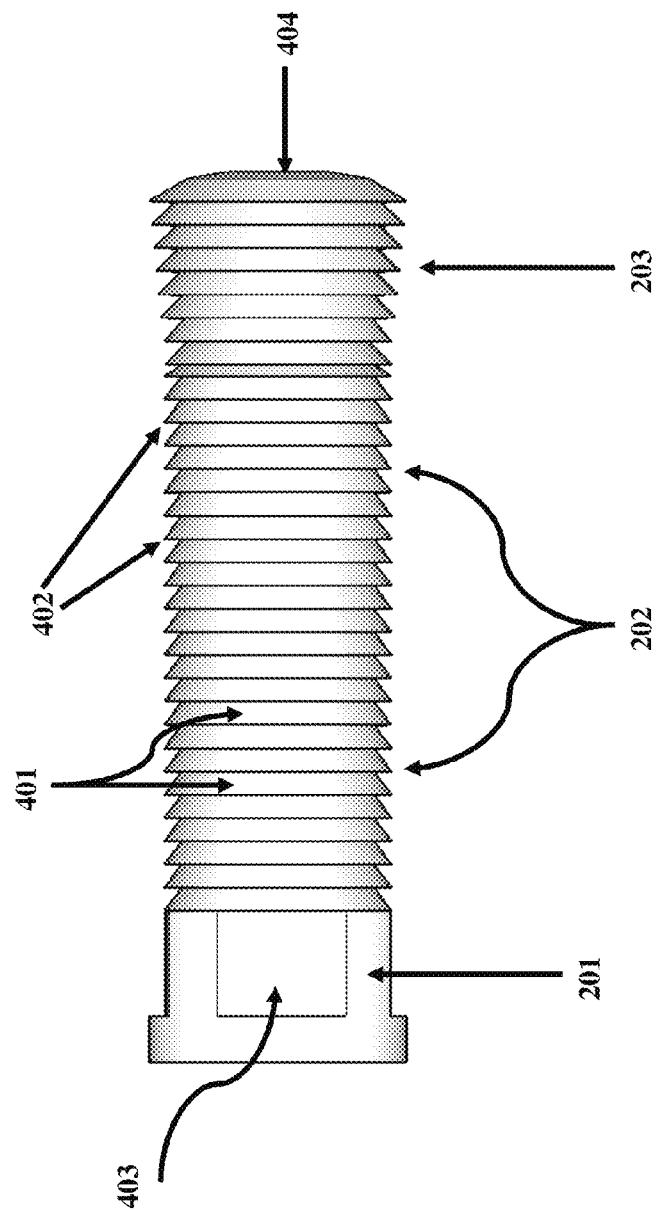
FIG. 6 is a side view of a foot anchor according to an exemplary embodiment of the present inventive concept.

The rider's upper body may be anchored to a sportbike in a sturdier, more stable, and more reliable fashion when utilizing the foot anchors 200 described herein. FIGS. 2 and 6, for example, illustrate that without utilizing the foot anchor 200, the rider's upper body may be anchored to a sportbike less reliably;

The foot anchor 200 (e.g. the left foot anchor) may be attached to a motorcycle in such a way that there is enough clearance between the gear shift lever 102 and the left foot anchor 200 so that a rider is able to position the rider's left foot toe area between the gear shift lever 102 and the left foot anchor 200 without exerting any pressure on either of them (see, e.g., FIG. 4).

The foot anchor 200 (e.g. the right foot anchor) may be attached to a motorcycle in such a way that there is enough clearance between the rear brake lever 104 and the right foot anchor 200 so that a rider is able to position the rider's right foot toe area between the rear brake lever 104 and the right foot anchor 200 without exerting any pressure on either of them (see, e.g., FIG. 1).

A rider may increase the benefit of the present inventive concept by gradually and over a period of time adopting the rider's body movements needed to mount, dismount, move about, and control a motorcycle equipped with foot anchors 200.

Referring to FIG. 3, for example, the sportbike rider's upper body may be anchored to a sportbike in a sturdier, more stable, and more reliable fashion when utilizing the foot anchors 200. FIG. 3 illustrates that without utilizing the foot anchor 200, the rider's upper body may be anchored to a sportbike less reliably.

A sportbike frame may include a swingarm pivot 611, which may be hollow inside. The swingarm pivot 611 may stretch across an entire sportbike frame, and may be visible on each side of a sportbike when viewed through the hollow portion of the swingarm pivot 611 (see, e.g., FIG. 5). A diameter of the hollow portion of the swingarm pivot 611 may be about 10 mm-20 mm, for example, and may be surrounded by a relatively large nut or other type of similar fastener.

Figure 5:
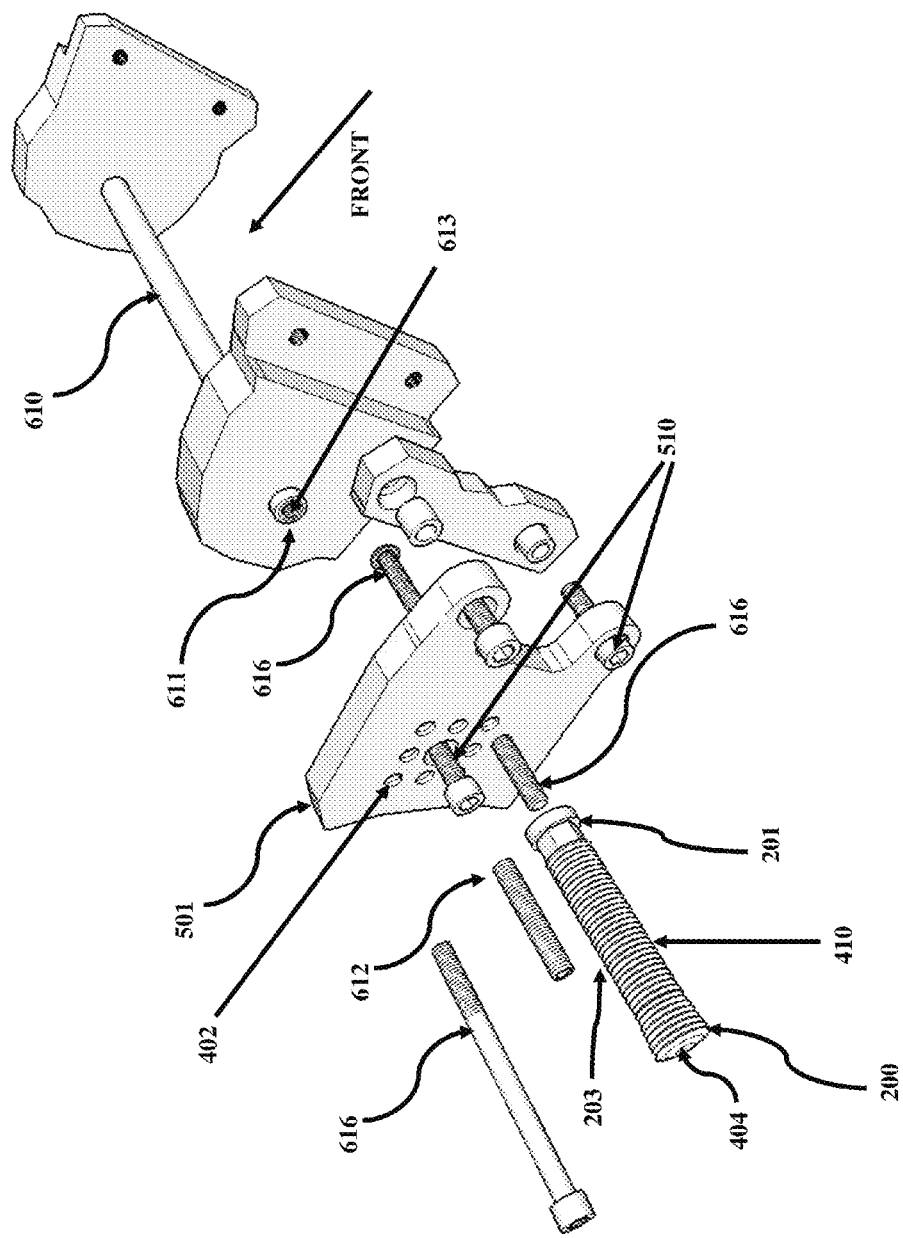
FIG. 5 is a left side exploded view of a potion of a sportbike frame including a foot anchor with a few exemplary mounting configurations along with a mounting plate, spacers, and various fasteners according to an exemplary embodiment of the present inventive concept.

Referring to FIGS. 4 and 5, a foot anchor 200 may be attached to a sportbike according to the following configuration. In case a location of a swingarm pivot hole 611 coincides with optimal desired location of foot anchors 200 for a specific sportbike and/or specific rider preference, a continuous rod 610 may be installed and a rod shaped foot anchor 200 made from a strong material may be inserted through a swingarm pivot hole 611, and with such length that rod shaped foot anchor 200 protrudes on both sides of a sportbike, effectively forming a foot anchor 200 on the left side and a foot anchor 200 on the ride side of a sportbike.

The rod shaped foot anchor 200 may have threads on both ends and may utilize a nut 613, a washer 615, and a damping washer 614 made from a relatively soft material such as rubber on each side of such rod. Tightened nuts 613 on both sides of the rod shaped foot anchor 200 may secure the rod shaped foot anchor 200 to the sportbike frame 101.

The middle part of the continuous rod 610 may be used to provide attachment to the sportbike frame 101, while the outer parts of the continuous rod 610 (e.g., the parts protruding from the interior of the sportbike frame 101) may be utilized as foot anchors 200 (see, e.g., FIGS. 1 and 5).

The outer parts of the continuous rod 610 might not be functionally suitable to act as foot anchors 200 due to their smaller diameter and/or due to their surface being too smooth, or too rough. A sleeve including one or more desired materials may be placed over the outer parts of the continuous rod 610. Such materials may provide increased diameter and/or appropriate friction properties (e.g., grooves) in order to function as a foot anchor 200.

The friction properties of outer parts of the continuous rod 610 may be modified (e.g., by the sleeves). The outer parts of the continuous rod 610 may have a groove on them, or an indentation similar to a thread such as individual concentric circles cut on the surface of the continuous rod 610 along a direction parallel to the straight driving path of the sportbike. The concentric circles (e.g., concentric grooves 401) may be relatively close to each other such that the space between the circles forms relatively sharp edges (e.g., pointed edges 402) similar to a thread that is not connected to adjacent threads (see e.g., FIG. 4 or 6).

The grooves or indentations may allow a rider to easily move a foot in a longitudinal direction of the sportbike (forward-and-backward) even with a slight upward pressure of a foot on a foot anchor 200. This increases a rider's safety in that a rider is able to remove a foot from under a foot anchor 200 by relaxing those muscles of rider's lower leg whose contraction moves the foot upward.

The grooves or indentations may prevent the rider's foot movement in lateral direction away from a sportbike when a rider's foot exerts an upward pressure on a foot anchor 200, which may anchor a rider's foot and the same leg to a sportbike until the time when a rider decides to remove his foot from under a foot anchor 200 as explained above.

Referring to FIGS. 4 and 5, a foot anchor 200 may be attached to a mounting plate 501, which in turn is attached to the sportbike by one or more fasteners 510 as described in more detail below. An attachment point for the mounting plate 501 may be provided by the continuous rod 610 disposed inside the hollow motorcycle swingarm pivot point 611, which may have threaded holes 613 on both ends.

Left and right mounting plates 501 may each be attached to the opposing ends of the continuous rod 610, respectively, and/or may be attached to the sportbike through footpeg mounts (interchangeably referred to as a "rearset") on the sportbike's frame 101. Thus, a rigid structure fully capable of supporting the foot anchor 200s and the associated load on them may be formed. A mounting plate 501 along with its respective footpeg mounts may provide a rigid structure so that the continuous rod 610 mentioned above need not be utilized.

Referring to FIG. 6, the foot anchor 200 may be a cylindrically shaped object which slightly widens at the end farthest from the sportbike (e.g., the end may be substantially mushroom shaped), having a slightly rounded tip 404 at the end farthest from a sportbike, and having a cutout 403 for a wrench at the end closest to a sportbike. The slightly rounded tip 404 may prevent injury in the event the end of the foot anchor 200 comes into contact with the rider or another person.

The foot anchor 200 may have a threaded hole at the end closest to a sportbike (e.g., in the foot anchor's base 201), and with a sufficient depth to stably attach the foot anchor 200 to the mounting plate 501 and/or the sportbike frame 101. The cutout 403 for a wrench may allow tightening of the foot anchor 200 with the threaded hole to the mounting plate 501 and/or the sportbike frame 101. The cutout 403 may be substantially square or rectangular, but exemplary embodiments of the present inventive concept are not limited thereto or thereby.

The foot anchor 200 may have a non-threaded hole, and the non-threaded hole may penetrate through substantially the entire body of the foot anchor 200 in order to be attached to a mounting plate 501.

The foot anchor 200 may have one or more indentations or grooves, as described above.

The continuous rod 610 may include a strong material such as a metal, may have a cylindrical shape, and may have two threaded holes at each end 613. The continuous rod 610 may have such a length that when inserted into a sportbike's hollow swingarm pivot hole 611 and aligned symmetrically, the continuous rod 610 may slightly extend beyond the motorcycle body and/or frame in order for a mounting plate 501 to be attached to each end of the continuous rod 610 to clear the sportbike's body and/or frame 101.

The mounting plate 501 may include a strong material such as a metal, and may be substantially flat. The mounting plate 501 may have a shape which adheres to the lines of a sportbike body and/or frame 101, may have a color which is consistent with the sportbike body and/or frame color, may have a sufficient thickness to provide rigidity. The mounting plate 501 may have recessed holes 613, which may be used to attach the mounting plate 501 to the sportbike frame at a number of attachment points, as described below in more detail. The mounting plate 501 may have threaded holes 613 used to attach the foot anchor 200, and may have a thickness so that the length of such threaded holes 613 is of sufficient length to stably fasten the foot anchor 200 to the sportbike.

The foot anchor 200 may be attached to the mounting plate 501 by a mounting screw 616, for example, a commonly known type set screw. The entire surface of the mounting screw 616 may be threaded, and may have an Allen socket at one end, for example. The foot anchor 200 may include the threaded hole at the end of the foot anchor 200 which is coupled to the mounting plate 501. The threaded hole may extend into the body of the foot anchor 200 to such depth that when the mounting screw 616 is fully screwed inside the foot anchor 200, the part of the mounting screw 616 outside the foot anchor 200 has the length which is substantially the same as the thickness of the mounting plate. Thus, the end of the foot anchor 200 closer to the sportbike may be in contact with the mounting plate 501 and may be flushly disposed against the mounting plate 501. The mounting screw 616 may be screwed inside the foot anchor 200 and tightened, for example, using a wrench. Another end of a mounting screw 616 may be screwed into the mounting plate 501 utilizing any of the threaded holes 402 disposed in the mounting plate (see, e.g., FIG. 5). The foot anchor 200 may be tightened by turning the foot anchor 200 using a hex wrench in conjunction with cutouts 403 on the surface of the foot anchor 200 as illustrated, for example, in FIG. 6.

The foot anchor 200 may have a non-threaded hole going through the entire body of the foot anchor 200 along its axis. The foot anchor 200 may be attached to the mounting plate 501 by a long mounting bolt 616 which protrudes through the foot anchor 200 hole and is screwed into the mounting plate 501 utilizing one or more of the threaded holes 402.

The foot anchor 200 may have a threaded hole at the end of the foot anchor 200 which is attached to the mounting plate 501, while the mounting plate 501 has non-threaded holes through which the foot anchor 200 can be attached.

The foot anchor 200 may be attached to the mounting plate 501 by a mounting bolt 616 inserted from the back of the mounting plate through one or more holes in the mounting plate and screwed into the foot anchor 200.

The mounting plate 501 may be attached to the motorcycle in a variety of locations. The mounting plate 501 may be attached to the continuous rod 610 by a bolt 510 inserted through a recessed hole in the mounting plate. The mounting plate 501 may be attached to the existing footpeg/rearset mounting holes using bolts going through a spacer and through the existing footpeg 103 or an aftermarket rearset mount. Each spacer may have such a length that the surface of the mounting plate 501 is perpendicular to the continuous rod 610.

The foot anchor 200 mounting holes 402 in the mounting plate 501 may be located near the holes which used to attach the mounting plate 501 to the sportbike footpeg/rearset mounting holes (see e.g., bolts 510). The mounting plate 501 may be small enough to provide enough rigidity so that the attachment to the continuous rod 610 need not be included, and therefore the continuous rod 610 need not be used.

The foot anchor 200 may be attached to the mounting plate 501 through one or more of three mounting plate holes 402 used to attach the mounting plate 501 to the sportbike. A longer screw or bolt may be utilized, which may attach the foot anchor 200 to the sportbike through the mounting plate 501. The longer bolt/screw may fasten both the foot anchor 200 and the mounting plate 501 to the sportbike using a single bolt/screw (see e.g., bolt 616).

Referring to FIG. 6, the foot anchor 200 may have a cylindrical shape, and may have the base 201 (e.g., at flat base) at an end of the foot anchor 200 which is closest to the sportbike frame 101 when the foot anchor 200 is attached to a motorcycle. The base 201 of the foot anchor 200 may have the cutout 403. The cutout 403 may have hexagonal or square shape so that the foot anchor 200 can be tightened using a hex wrench. The foot anchor 200 may include a plurality of grooves or indentations. The grooves or indentations (e.g., concentric grooves 401) may be substantially evenly spaced in a direction perpendicular to the concentric groves 401 of asymmetric profile providing sharp concentric edges 402. Points (e.g., edges 402) of the concentric edges 402 may be pointed in the direction towards the base of the foot anchor 200. The concentric grooves 401 may reduce or prevent slippage of a rider's upper foot area in lateral direction away from a sportbike during the time when the foot anchor 200 is utilized as described above. The concentric grooves 401 may allow the rider's foot so slide in a lateral direction towards the sportbike. The end 404 of the foot anchor 200 further away from the sportbike may have a slightly larger diameter than the end of the foot anchor 200 closer to the sportbike. The diameter of the central portion 202 of the foot anchor 200 may be substantially the same as the diameter of the portion of the foot anchor 200 closest to the sportbike. The end of the foot anchor 200 further away from the sportbike (e.g., end portion 203) having the slightly larger diameter may be substantially mushroom shaped. The outer edge 404 of the foot anchor 200 facing away from the sportbike may have a rounded surface. The rounded surface may reduce or prevent injury in the even the sportbike were to contact a rider's body.

While the inventive concept has been particularly shown and described with reference to exemplary embodiments thereof, it will be understood by those of ordinary skill in the art that various changes in form and detail may be made therein without departing from the spirit and scope of the present inventive concept.

What is claimed is:

1. A motorcycle foot anchor, comprising:
   a foot anchor coupled to a motorcycle frame,
   wherein the foot anchor comprises a base, a body and an end portion,
   wherein the base of the foot anchor is coupled to the motorcycle frame at a position of the motorcycle frame that is higher than a shift lever disposed on the motorcycle frame and closer to a front of the motorcycle frame than a foot peg disposed on the motorcycle frame, and
   wherein the foot anchor protrudes from the motorcycle frame.

2. The motorcycle foot anchor of claim 1, wherein the base of the foot anchor comprises a cutout configured to receive a tightening tool.

3. The motorcycle foot anchor of claim 1, wherein a surface of the end portion of the foot anchor facing away from the motorcycle frame is round.

4. The motorcycle foot anchor of claim 1, further comprising a mounting plate disposed between the foot anchor and the motorcycle frame.

5. The motorcycle foot anchor of claim 4, wherein the mounting plate comprises a plurality of mounting holes configured to stably fix the foot anchor to the motorcycle frame in a plurality of locations.

6. The motorcycle foot anchor of claim 4, wherein the foot anchor comprises a threaded hole, and wherein the foot anchor is coupled to the mounting plate through a threaded protrusion disposed on the mounting plate and corresponding to the threaded hole of the foot anchor.

7. The motorcycle foot anchor of claim 1, wherein the foot anchor is detachably coupled to the motorcycle frame.

8. The motorcycle foot anchor of claim 1, wherein the foot anchor is configured to fold toward to motorcycle frame or retract into the motorcycle frame.

9. The motorcycle foot anchor of claim 1, wherein the foot anchor comprises a plurality of concentric grooves.

10. The motorcycle foot anchor of claim 9, wherein the end portion of the foot anchor has a larger diameter than a diameter of the body of the foot anchor.

11. The motorcycle foot anchor of claim 1, wherein the foot anchor comprises steel or aircraft grade aluminum.

12. A motorcycle foot anchor, comprising:
    a foot anchor comprising a rod disposed in a swingarm pivot of a motorcycle frame,
    wherein the swingarm pivot is disposed at a position of the motorcycle frame that is higher than a shift lever disposed on the motorcycle frame and closer to a front of the motorcycle frame than a foot peg disposed on the motorcycle frame,
    wherein the rod comprises a first body, a second body, a first end portion and a second end portion, and
    wherein first body and the first end portion of the foot anchor protrude from a first side of the motorcycle frame and the second body and the second end portion of the foot anchor protrude from a second side of the motorcycle frame.

13. The motorcycle foot anchor of claim 12, wherein the foot anchor comprises a plurality of threaded edges disposed on the first and second bodies of the foot anchor.

14. The motorcycle foot anchor of claim 12, wherein surfaces of the first and second end portions of the foot anchor facing away from the motorcycle frame are round.

15. The motorcycle foot anchor of claim 12, wherein the rod further comprises threaded bases at portions of the rod protruding from and in contact with the first and second sides of the motorcycle frame, and wherein the rod further comprises nuts configured to stably fix the rod to the motorcycle frame.

16. The motorcycle foot anchor of claim 15, further comprising a dampening washer disposed between the nuts and the motorcycle frame.

17. The motorcycle foot anchor of claim 16, wherein the first and second end portions of the foot anchor have a larger diameter than a diameter of the body of the foot anchor.

18. The motorcycle foot anchor of claim 12, wherein the rod is a continuous rod projecting through the motorcycle frame.

19. The motorcycle foot anchor of claim 12, wherein the foot anchor is configured to fold toward to motorcycle frame or retract into the motorcycle frame.

20. The motorcycle foot anchor of claim 12, wherein the foot anchor comprises steel or aircraft grade aluminum.

\* \* \* \* \*